Oct. 15, 1957
W. A. RAY
2,810,005
THERMOCOUPLE STRUCTURE
Filed Jan. 11, 1955
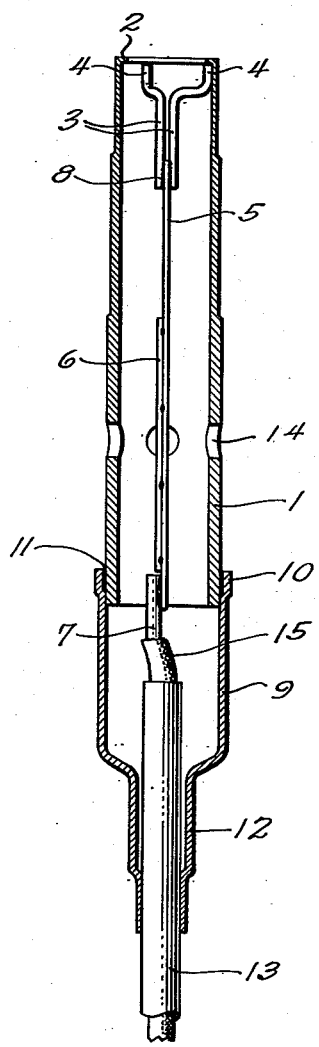
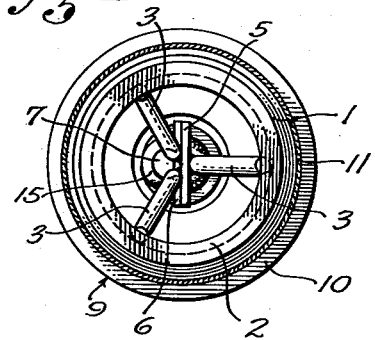
INVENTOR,
WILLIAM A. RAY
BY Flam and Flam
ATTORNEYS.

United States Patent Office 2,810,005
Patented Oct. 15, 1957

2,810,005

THERMOCOUPLE STRUCTURE

William A. Ray, North Hollywood, Calif., assignor to General Controls Co., a corporation of California Application January 11, 1955, Serial No. 481,133

4 Claims. (Cl. 136—4)

This invention relates to a thermocouple structure, and more particularly to a structure for use in fuel burner systems.

The operation of such thermocouples or thermopiles to generate a minute controlling potential difference is now well-understood. The thermoelectric effect is obtained by providing a "hot" junction between dissimilar metals, and which is heated by the pilot flame of the burners. The metals or alloys adaptable for this purpose are, for example, stainless steel, chromel, copel and Alumel. The relatively "cold" junctions are usually formed by the conductors attached to the cold ends of the thermoelectric conductors.

It is desirable that the generation of thermoelectricity be promptly reduced upon failure of the pilot flame, so that safety devices may operate to shut off the fuel to the burner. It is one of the objects of this invention to provide a thermoelectric generator operating upon pilot flame failure, in which the temperature of the hot junction quickly attains a low value sufficient to cause operation of the safety valve.

It is another object of this invention to provide a thermocouple structure that is simple and inexpensive to manufacture.

One of the factors limiting the value of the current through a thermocouple is the unavoidable presence of substantial resistance in the thermocouple circuit and through the thermocouple conductors. This is an especially important factor, since the potential difference generated is of the order of one millivolt. It is still another object of this invention to provide a thermocouple structure in which the resistance can be maintained at a relatively low value.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a longitudinal view of a thermocouple structure incorporating the invention; and Fig. 2 is an enlarged plan view thereof.

The thermocouple structure includes a generally tubular jacket member 1 which may be made of a material capable of withstanding relatively high temperature. For example, it may be made of stainless steel. It forms one of the two dissimilar metals to provide a thermocouple junction. When in use, the member 1 is substantially in upright position.

The member 1 is provided with an inwardly turned flange 2. Beneath this flange 2 is located a plurality of thermocouple conductors 3, made for example of Alumel. These conductors are equiangularly spaced, as indicated clearly in Fig. 2, around the longitudinal axis of the member 1. The upper ends 4 of each of the conductors 3 are in contact with the interior surface of the jacket 1 and are joined thereto as by spot welding. These thermocouple conductors are bent inwardly so as to converge toward the axis of the jacket 1 and are, in turn, spot welded to the upper end of a connector bar 5. This bar 5 is of quite large cross sectional area, and forms a cold junction with the lower end of the conductors 3.

The wall of the tubular jacket 1 is purposely made somewhat thin at the upper end so as to provide rapid heat transference to the hot junctions formed by the three conductors 3, when a pilot burner flame or flames are applied to the top of the member. Further, in order to strengthen the structure, as well as to reduce resistance, a strip 6 of stainless steel may be spot welded adjacent the lower end of the connector member 5.

The lead 7 is silver soldered to the lower end of the member 5 and forms a connection to the cold junction 8. Insulation 15 is disposed over this lead.

Electrical connection to the jacket member 1 is effected by aid of a lead retainer 9. This lead retainer has an enlarged upper end 10 surrounding the thickened wall of jacket 1. Between the enlarged end 10 and the lower end of the jacket 1 a silver solder connection 11 is provided. The lower end 12 of the lead retainer 9 is reduced in diameter and is electrically connected to the conductor 13 which forms the other terminal of the thermocouple structure. The insulation layer 15 maintains the conductors 7 and 13 electrically isolated.

It is noted that the upper end of the thermocouple structure is open. A plurality of apertures 14 may be provided transversely of the wall of jacket 1 for inducing air flow through this jacket.

One or more pilot flames may play upon the exterior of the jacket 1 at the upper end thereof in order to heat the hot junctions formed between the ends 4 and the tubular jacket 1.

The conductors 3 form a plurality of hot junctions in parallel; in this way the internal resistance of the thermocouple structure is reduced. Furthermore, by the provision of conductors of large cross-sectional areas, such as tube 1 and the members 5 and 6, a further lowering of the resistance is effected.

Since the thermocouple conductors 3 are quite short, the temperature difference between the hot and cold junctions is quite quickly reduced upon failure of the pilot flame. This assures a quick response of the system to flame failure.

The inventor claims:

1. In a thermocouple structure: an upright tubular metallic member open at the top; a plurality of conductors within said member, each of said conductors having one end joined to the interior surface of the member, and adjacent an open end of said member, said conductor ends being angularly spaced from each other, the other conductor ends converging and out of contact with said surface; said conductors being short as compared with said member and being thermoelectrically dissimilar to said member; said member having an opening below said conductor; and a connector joined to said other ends; said member having an opening at the top to provide a flow of air upwardly past the said other ends of the conductors.

2. In a thermocouple structure: an upright tubular metallic member open at the top; said metallic member having an inwardly directed flange at one end, said end being open; a plurality of relatively short thermoelectric conductors within said member, and having ends within the flange and connected to the inner surface of the flange, at equiangularly spaced points along the flange; the other ends of the conductors being spaced inwardly from the inner surface of the member and in electrical contact; said conductors being dissimilar thermoelectrically to said member; said member having an opening below said conductors; and a flat strip connector within said member and electrically connected to the said other end of the conductors; said member having an opening at the top to provide a flow of air upwardly past the said other ends of the conductors.

3. In a thermocouple structure: an upright tubular metallic member; a conductor having an end joined to the interior surface of the member at the upper open end of the member, the other end of the conductor being spaced from said surface; a connector joined to said other end of said conductor; said conductor being of a material thermoelectrically dissimilar from that of said member and said connector; said member having an opening for passing ambient air into the member at a place spaced from said upper end so that a flame at the said upper end of said member induces flow of air into said member and outwardly at said upper end; and means shielding said one end of said conductor from the flowing air.

4. In a thermocouple structure: an upright tubular metallic member having an inwardly directed flange at its upper open end; a conductor having one end joined to the interior surface of the member and beneath the flange, the other end of said conductor being spaced from said surface; and a connector joined to said other end of said conductor; said conductor being made of material thermoelectrically dissimilar from the materials of said member and said connector; said member having an opening spaced from said upper end for passing ambient air into the member so that a flame at said flanged end induces flow of air into said member and outwardly at said upper end to cool the said other end of the conductor; said flange shielding said one end of the conductor from the flowing air.

References Cited in the file of this patent
UNITED STATES PATENTS

| 2,184,169 | Sordahl | Dec. 19, 1939 |
| 2,304,489 | Wetzel | Dec. 8, 1942 |

FOREIGN PATENTS

| 559,183 | Great Britain | Feb. 8, 1944 |
| 509,049 | Canada | Jan. 11, 1955 |